United States Patent [19]

Ohmi

[11] Patent Number: 4,586,857
[45] Date of Patent: May 6, 1986

[54] HOLE CUTTER
[75] Inventor: Shohei Ohmi, Anjo, Japan
[73] Assignee: Omi Kogyo Co., Ltd., Anjo, Japan
[21] Appl. No.: 607,360
[22] Filed: May 4, 1984
[30] Foreign Application Priority Data
Dec. 17, 1983 [JP] Japan ................. 58-238494
[51] Int. Cl.⁴ ................. B23B 41/02; B23B 51/04
[52] U.S. Cl. ................. 408/206; 408/204; 408/703
[58] Field of Search ........... 408/204, 206, 703, 713, 408/1 R, 56, 67, 241 R

[56] References Cited
U.S. PATENT DOCUMENTS

| 3,609,056 | 9/1971 | Hougen | 408/204 |
| 3,765,789 | 10/1973 | Hougen | 408/204 |
| 3,860,354 | 1/1975 | Hougen | 408/206 |
| 4,322,187 | 3/1982 | Hougen | 408/204 |
| 4,322,188 | 3/1982 | Hougen | 408/206 |
| 4,452,554 | 6/1984 | Hougen | 408/206 |

Primary Examiner—Z. R. Bilinsky
Attorney, Agent, or Firm—Jordan and Hamburg

[57] ABSTRACT

A hole cutter having a generally cylindrical body provided with a plurality of first and second cutting teeth around its lower end. Each of the first cutting teeth has a bottom surface defining along its front edge at least two cutting edges which are separated from each other by a shoulder having a certain width and extending substantially circumferentially of the cutter body. Each of the second cutting teeth has a bottom surface provided with a ridgeline extending substantially circumferentially of the body and defining two cutting edges along the front edge of the bottom surface of each second cutting tooth. Each of the cutting edges on each of the second cutting teeth is partly located below one of the cutting edges on each first cutting tooth.

8 Claims, 21 Drawing Figures

FIG. 1
FIG. 2
FIG. 3
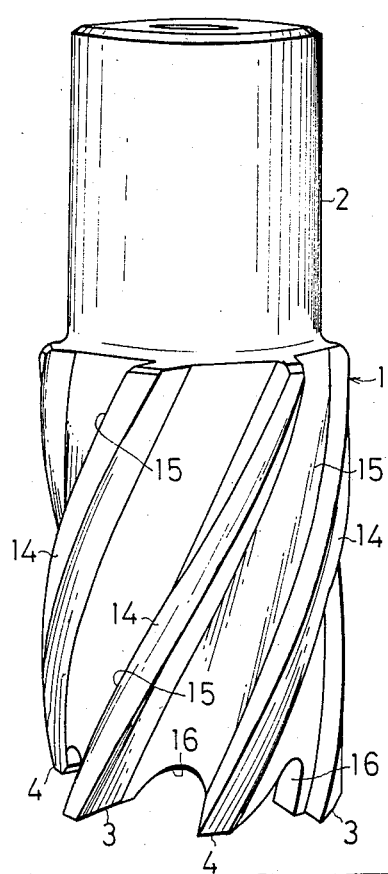
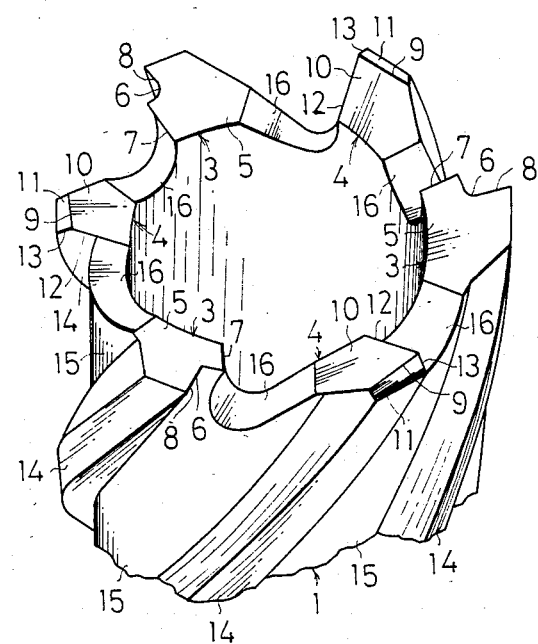
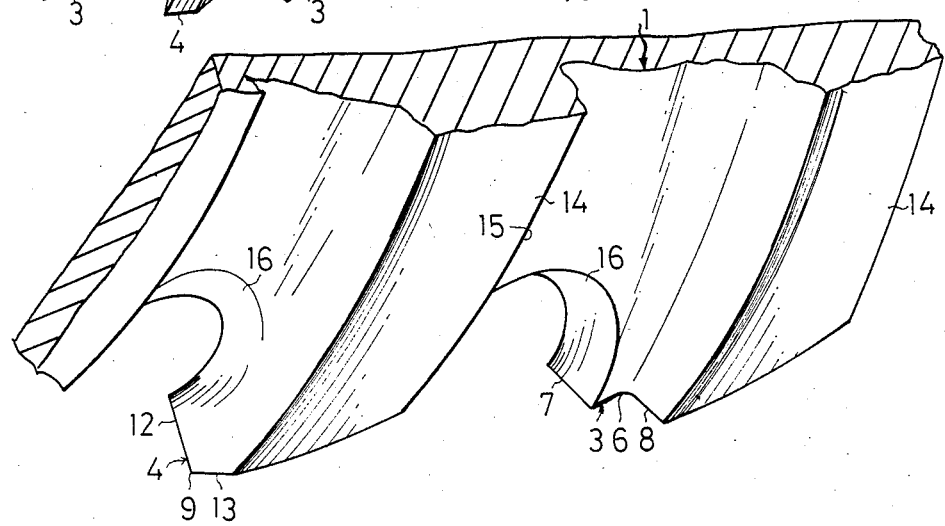

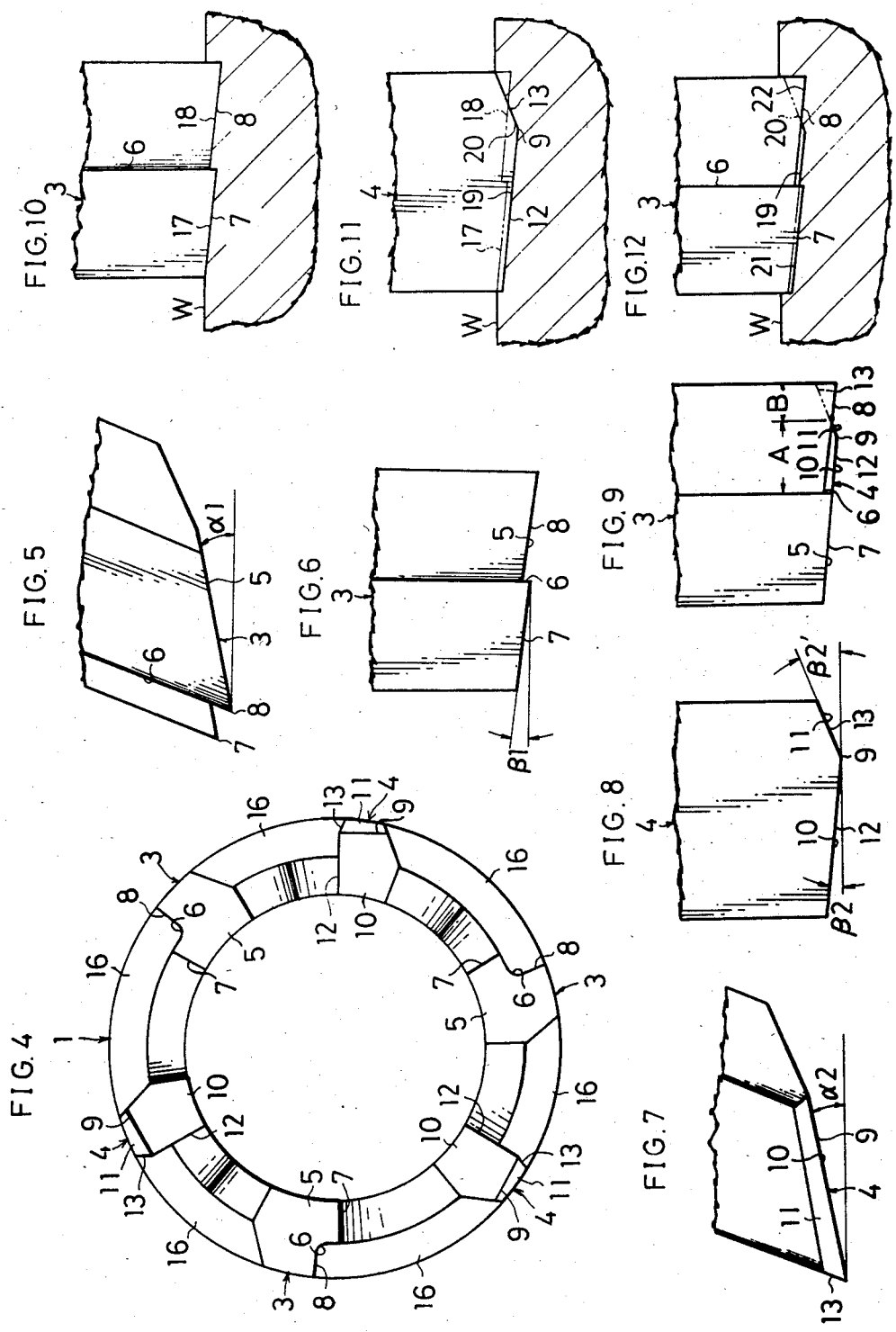

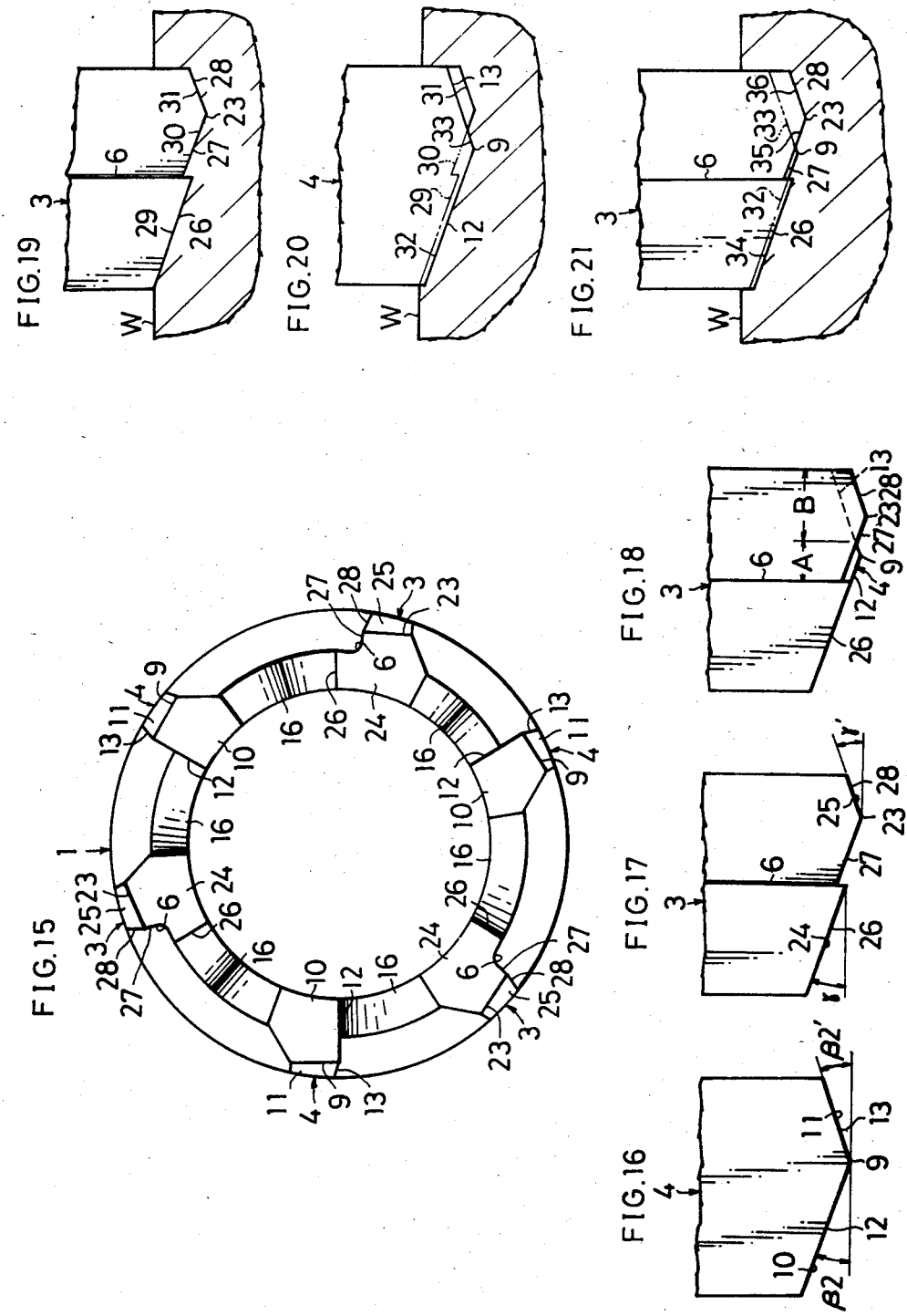

4,586,857

HOLE CUTTER

FIELD OF THE INVENTION

This invention relates to a hole cutter having a generally cylindrical body provided with a plurality of cutting teeth around its lower end.

SUMMARY OF THE INVENTION

It is an object of this invention to provide a hole cutter having a long life.

A hole cutter has a generally cylindrical body provided around its lower end with a plurality of first cutting teeth and a plurality of second cutting teeth which are preferably arranged alternately. Each of the first cutting teeth has a relief surface defining at its front edge an inner cutting edge and an outer cutting edge which are separated from each other by a shoulder. Each of the second cutting teeth has two relief surfaces each defining at its front edge a cutting edge which is at least partly spaced below the outer cutting edge of the first cutting tooth.

Each cutting tooth has, therefore, a portion not contributing to any cutting job. This means a reduction in the resistance to which the cutting teeth are subjected during a cutting job; therefore, they have a prolonged life.

BRIEF DESCRIPTION OF THE DRAWINGS

FIG. 1 is a perspective view of a hole cutter embodying this invention;

FIG. 2 is a fragmentary enlarged perspective view showing particularly how a plurality of cutting teeth are arranged on the hole cutter of FIG. 1;

FIG. 3 is a fragmentary enlarged view showing a first cutting tooth and a second cutting tooth;

FIG. 4 is an enlarged bottom plan view of the hole cutter shown in FIG. 1;

FIG. 5 is a fragmentary side elevational view showing in an enlarged way the cutting edges of a first cutting tooth on the hole cutter of FIG. 1;

FIG. 6 is a front elevational view of the first cutting tooth shown in FIG. 5;

FIG. 7 is a fragmentary enlarged side elevational view showing the cutting edges of a second cutting tooth on the hole cutter of FIG. 1;

FIG. 8 is a front elevational view of the second cutting tooth shown in FIG. 7;

FIG. 9 is a fragmentary enlarged front elevational view showing the cutting edges of a first cutting tooth and a second cutting tooth on the hole cutter of FIG. 1;

FIGS. 10 to 12 are front elevational views, partly in section, showing various stages of the cutting operation performed by the cutting teeth shown in FIGS. 5 to 9;

FIG. 15 is a bottom plan view of the hole cutter shown in FIG. 13;

FIG. 16 is a fragmentary enlarged front elevational view showing the cutting edges of a second cutting tooth on the hole cutter of FIG. 13;

FIG. 17 is a fragmentary enlarged front elevational view showing the cutting edges of a first cutting tooth on the hole cutter of FIG. 13;

FIG. 18 is a view similar to FIG. 9, but relating to the hole cutter of FIG. 13; and FIGS. 19 to 21 are a set of views similar to FIGS. 10 to 12, but relating to the hole cutter of FIG. 13.

DETAILED DESCRIPTION OF THE INVENTION

Figure 13:
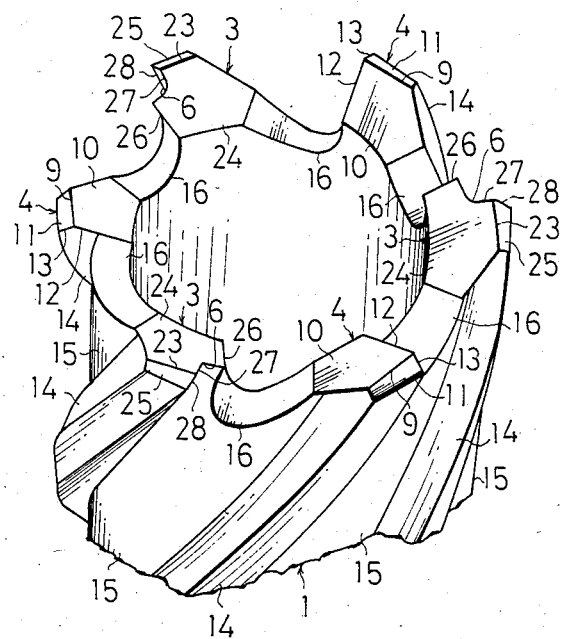
FIG. 13 is a view similar to FIG. 2, but showing another embodiment of this invention.

A hole cutter embodying this invention is shown in FIGS. 1 to 12. It comprises a generally cylindrical body 1 provided at its upper end with a spindle 2 adapted for connection to the rotary shaft of, for example, a drilling machine not shown. The cutter body 1 is provided around its lower end with a plurality of first cutting teeth 3 and a plurality of second cutting teeth 4. The second cutting teeth 4 are shaped differently from the first cutting teeth 3 and arranged alternately therewith in circumferentially equally spaced apart relationship, as shown in FIGS. 2 and 4.

Each of the first cutting teeth 3 has an inclined bottom surface defining a relief surface 5. The relief surface 5 is downwardly inclined from its rear edge to its front edge and from its inner edge to its outer edge, as is obvious from FIGS. 2, 3, 5 and 6. The relief surface 5 has a relief angle $\alpha 1$ (FIG. 5) of 6° and a rake angle $\alpha 1$ (FIG. 6) of 5° relative to the horizontal plane in which the lower end of the hole cutter is rotatable. The term "front edge" as herein used means the leading edge of the relief surface of a particular cutting tooth moving when the hole cutter is rotated, and the term "rear edge" means the opposite edge. The "inner and outer edges" are believed to be self-explanatory.

The front edge of the relief surface 5 defines an inner cutting edge 7 and an outer cutting edge 8 which are separated from each other by a substantially circumferentially extending shoulder 6 which is located approximately midway between the inner and outer edges of the relief surface 5. The outer cutting edge 8 is, therefore, located behind the inner cutting edge 7. The outer cutting edge 8 projects downwardly slightly beyond the inner cutting edge 7 due to the presence of the rake angle $\beta 1$, as shown in FIG. 5.

Each of the second cutting teeth 4 has a bottom surface having a generally circumferentially extending ridgeline 9 which defines an inner relief surface 10 on one side thereof and an outer relief surface 11 on the other side thereof, as shown in FIGS. 2, 3, 7 and 8. The inner and outer relief surfaces 10 and 11 are upwardly inclined from the ridgeline 9 to the inner and outer edges, respectively, of the tooth 4. The inner and outer relief surfaces 10 and 11 have a relief angle $\alpha 2$ (FIG. 7) of 6°, which is equal to the relief angle $\alpha 1$ on the first cutting tooth 3. The inner relief surface 10 has a rake angle $\beta 2$ (FIG. 8) of 5°, which is equal to the rake angle $\beta 1$ on the first cutting tooth 3, relative to the horizontal plane in which the lower end of the hole cutter is rotatable, while the outer relief surface 11 has a rake angle $\beta 2'$ (FIG. 8) of 20°.

The inner relief surface 10 has a front edge defining an inner cutting edge 12, and the outer relief surface 11 has a front edge defining an outer cutting edge 13. The ridgelines 9 on the second cutting teeth 4 are located radially outwardly of the shoulders 6 on the first cutting teeth 3 and in a plane below the plane of the outer cutting edge 8 on the first cutting tooth 3. The inner cutting edge 12 lies in the same plane with the inner cutting edge 7 on the first cutting tooth 3 and extends downwardly to the ridgeline 9, as shown in FIG. 9. The outer cutting edge 13 has a portion lying below the outer cutting edge 8 on the first cutting tooth 3, but the plane in which the edge 13 lies intersects the plane of the edge 8 so that the remaining or outer portion of the edge 13 may lie above the edge 8, as shown in FIG. 9. Therefore, a portion of the inner cutting edge 12 and a portion of the outer cutting edge 13 are located below the outer cutting edge 8 on the first cutting tooth 3 as shown at A, while the remaining or outer portion of the outer cutting edge 13 is located above the outer cutting edge 8 as shown at B.

The cutter body 1 has an outer peripheral surface provided with a plurality of spiral projections 14 each extending upwardly from one of the cutting teeth 3 and 4, and every two adjoining projections 14 define a spiral groove 15 for the ejection of chips therebetween, as shown, for example, in FIG. 1. A gullet 16 for chip ejection is formed at the lower edge of the cutter body 1 between every two adjoining cutting teeth 3 and 4.

The operation of the hole cutter hereinabove described will now be described with reference to FIGS. 10 to 12. If the first cutting teeth 3 are brought into contact with the work W, the inner and outer cutting edges 7 and 8 of each tooth 3 form an inner cut surface 17 and an outer cut surface 18, respectively, on the work W, as shown in FIG. 10, while producing two separate chips, which are ejected through the ejection groove 15 or gullet 16. If the second cutting teeth 4 are, then, brought into contact with the cut surfaces 17 and 18, the entire inner cutting edge 12 and an inner portion of the outer cutting edge 13 form new cut surfaces 19 and 20, respectively, on the work W, as shown in FIG. 11. The outer portion of the outer cutting edge 13 does not, however, contact and cut the cut surface 18. The second cutting teeth 4 are, therefore, subjected to a smaller amount of resistance than if the entire cutting edges thereof were used for the cutting operation. The teeth 4 have a prolonged life without getting broken quickly even if the cutter is used at a high speed.

The first cutting teeth 3 are, then, brought into contact with the cut surfaces 19 and 20. The inner cutting edge 7 of each tooth 3 forms a new inner cut surface 21 in a cut surface 19, and the outer portion of its outer cutting edge 8 forms a new outer cut surface 22 in a cut surface 20, as shown in FIG. 12. The inner portion of the outer cutting edge 8 does not contact and cut the cut surface 19. This means a reduction in the resistance to which the first cutting teeth 3 are subjected, and therefore, a drastic prolongation of their life. The chips produced by the inner and outer cutting edges 7 and 8 of each tooth 3 are completely separate from each other. This means a reduction in the resistance exerted on the cutter by the chips when they are ejected, and therefore, an improvement in the working efficiency of the cutter.

Each of the first and second cutting teeth 3 and 4 has a portion which does not contribute to the cutting operation, as hereinabove stated. This feature enables a reduction in the possibility of the teeth 3 and 4 being damaged if the hole cutter is operated at a high speed for a long period of time. The relief surfaces 5 of the first cutting teeth 3 and the relief surfaces 10 and 11 of the second cutting teeth 4 have an equal relief angle, and the relief surfaces 5 of the first cutting teeth 3 and the inner relief surfaces 10 of the second cutting teeth 4 have an equal rake angle, as hereinbefore stated. This feature greatly facilitates the sharpening of the relief surfaces 5, 10 and 11.

Another hole cutter embodying this invention is shown in FIGS. 13 to 21. The principal difference between the cutter of FIGS. 1 to 12 and that of FIGS. 13 to 21 resides in the shape of the first cutting teeth 3. The cutter which is going to be described likewise has a plurality of first cutting teeth 3 and a plurality of second cutting teeth 4 which are arranged alternately with each other. Each of the first cutting teeth 3, however, has at its bottom a ridgeline 23 lying substantially circumferentially of a cutter body 1, and defining an inner relief surface 24 on one side thereof and an outer relief surface 25 on the other side thereof, as shown in FIGS. 13 to 15 and 17. The relief surfaces 24 and 25 have an equal relief angle. The inner relief surface 24 has a rake angle $\gamma$ (FIG. 17) of 20° to 25° relative to the horizontal plane in which the lower end of the hole cutter is rotatable, while the outer relief surfaces 25 has a rake angle $\gamma'$ of 15° to 25°. Each of the second cutting teeth 4 has an inner relief surface 10 and an outer relief surface 11 which are defined by a ridgeline 9, as is the case with the hole cutter of FIGS. 1 to 12. The inner relief surface 10 has a rake angle $\beta_2$ (FIG. 16) of 20° to 25° which is equal to the rake angle $\gamma$ of the inner relief surface 24 on the first cutting tooth 3, and the outer relief surface 11 has a rake angle $\beta_2'$ (FIG. 16) of 15° to 25° which is equal to the rake angle $\gamma'$ of the outer relief surface 25 on the first cutting tooth 3.

Figure 14:
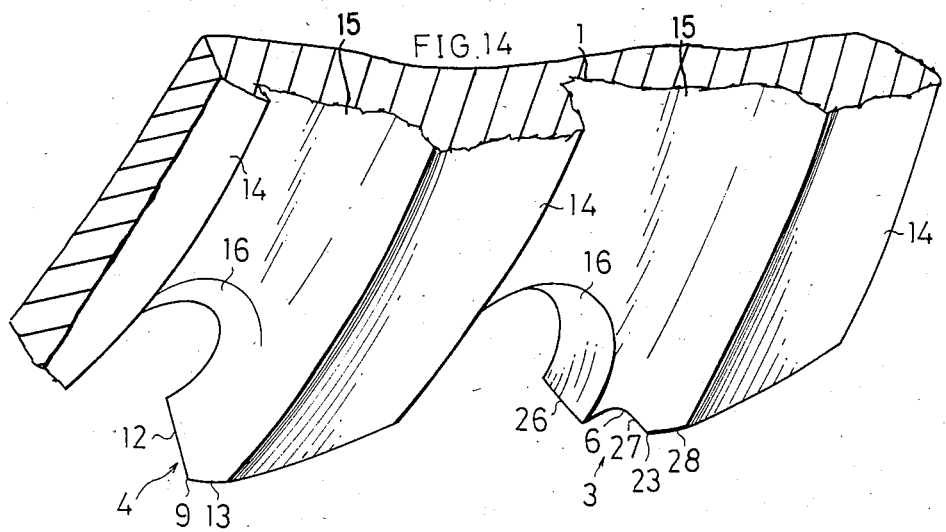
FIG. 14 is a view similar to FIG. 3, but relating to the hole cutter of FIG. 13.

The inner relief surface 24 of each first cutting tooth 3 has a front edge defining an inner cutting edge 26 and a middle cutting edge 27 located behind the inner cutting edge 26. The middle cutting edge 27 is completely separated from the inner cutting edge 26 by a shoulder 6 provided substantially midway between the inner and outer peripheral edges of the tooth 3 and extending generally circumferentially of the cutter body 1, as shown in FIGS. 14, 15 and 17. The rake angle $\gamma$ of the inner relief surface 24 makes a difference in height between the inner and middle cutting edges 26 and 27, as shown in FIG. 17.

The outer relief surface 25 has a front edge defining an outer cutting edge 28 which is smaller in width than the inner and middle cutting edges 26 and 27. The ridgeline 9 on each second cutting tooth 4 has a front end located in a plane below the plane in which approximately the middle point of the middle cutting edge 27 on each first cutting tooth 3 is located, as shown in FIG. 18. The second cutting tooth 4 has an inner cutting edge 12 extending radially inwardly from the front end of the ridgeline 9, and an outer cutting edge 13 extending radially outwardly therefrom. Therefore, a portion of the inner cutting edge 12 and a portion of the outer cutting edge 13 are located below the middle cutting edge 27 on each first cutting tooth 3 as shown at A in FIG. 18, while the remaining or outer portion of the outer cutting edge 13 is located above the middle and outer cutting edges 27 and 28 on the first cutting tooth 3 as shown at B.

If the first cutting teeth 3 are brought into contact with the work W, the inner, middle and outer cutting edges 26, 27 and 28 of each tooth 3 form three cut surfaces 29, 30 and 31, respectively, as shown in FIG. 19. If the second cutting teeth 4 are, then, brought into contact with the cut surfaces 29 to 31, the inner cutting edge 12 of each tooth 4 forms a new inner cut surface 32 in the cut surfaces 29 and 30, and the inner portion of the outer cutting edge 13 forms a new cut surface 33 in the cut surface 30, as shown in FIG. 20. The remaining or outer portion of the outer cutting edge 13, however, does not contact and cut the cut surfaces 30 and 31. This means a reduction in the resistance to which the second cutting teeth 4 are subjected, and the teeth 4 have a prolonged life accordingly.

The first cutting teeth 3 are, then, brought into contact with the work W again. The inner cutting edge 26 of each tooth 3, an outer portion of its middle cutting edge 27 and its outer cutting edge 28 form new cut surfaces 34, 35 and 36, respectively, as shown in FIG. 21. As is obvious, the remaining or inner portion of the middle cutting edge 27 does not contact any part of the work W, and thereby contributes to a reduction in the resistance to which the first cutting teeth 3 are subjected.

The presence of the cutting edge portions not contacting any part of the work, while the remaining portions contribute satisfactorily to the cutting operation, ensures a prolonged life for both of the first and second cutting teeth 3 and 4.

The invention has been described with reference to two embodiments thereof. They are not intended to limit the scope of this invention, but a variety of modifications may be possible within the scope of this invention, as will hereinafter be set forth briefly by way of example:

(1) The cutting teeth do not necessarily need to be formed on the cutter body itself, but may be formed on tips which are separate from the cutter body, and which are joined to its lower end by brazing or otherwise.

(2) The first and second cutting teeth do not necessarily need to be disposed exactly alternately with each other, but other arrangements may be possible. For example, it is possible to dispose two first cutting teeth and one second cutting tooth in alternate relationship. It is, however, desirable to ensure that every two diametrically opposite teeth be of the same type.

(3) A plurality of shoulders may be provided along the front edge of each first cutting tooth to define three or more cutting edges which are completely separated from one another.

(4) A variety of modifications may be possible to the relief and rake angles of the relief surfaces on the first and second cutting teeth.

What is claimed is:

1. A hole cutter comprising:
    a generally cylindrical cutter body adapted to be rotated by power means and having an end portion, and
    a plurality of first and second cutting teeth connected to and situated circularly around the end portion of the cutter body, said first and second cutting teeth being mutually interspersed around the end portion of the cutter body,
    each first cutting tooth including at least one first cutting surface having a predetermined relief angle and a rake angle relative to the horizontal plane perpendicular to the central axis of the cutter body, said relief angle extending rearwardly relative to the rotational direction of the cutter body and the rake angle extending radially of the cutter body, and at least first and second cutting edges situated at a front end of the first cutting surface, said second cutting edge being situated radially outwardly and circumferentially rearwardly away from the first cutting edge relative to the cutter body so that the first and second cutting edges form stepped edges and the second cutting edge is located from the cutter body more remotely than the first cutting edge,
    each second cutting tooth including a second inner cutting surface facing radially inwardly of the cutter body and having the same rake angle as the first cutting tooth, a second outer cutting surface facing radially outwardly of the cutter body and having a rake angle greater than that of the first cutting tooth, said second inner and outer cutting surfaces having the same relief angles as that of the first cutting tooth, a crest dividing the second inner and outer cutting surfaces, a third cutting edge situated at a front edge of the second inner cutting surface and being located in the same plane as that of the first cutting edge of the first cutting tooth in the axial direction of the cutter body, and a fourth cutting edge situated at a front edge of the second outer cutting surface and extending radially upwardly of the cutter body to intersect a plane of the second cutting edge of the first cutting tooth, portions of the third and fourth cutting edges of the second cutting tooth adjacent to the crest being located below the second cutting edge of the first cutting tooth in the axial direction of the cutter body so that when the hole cutter is operated, the first and second cutting teeth partly cut a workpiece, and the first cutting tooth cuts separate chips in the radial direction of the hole cutter to thereby reduce resistance for facilitating ejection of the chips from the hole cutter.

2. A hole cutter according to claim 1, in which said crest of the second cutting tooth is located radially outwardly away from the first cutting edge of the first cutting tooth.

3. A hole cutter according to claim 1, in which said first cutting surface of the first cutting tooth includes a first inner cutting surface facing radially inwardly of the cutter body, a first outer cutting surface facing radially outwardly of the cutter body, and a first crest dividing the first inner and outer cutting surfaces, said first crest substantially perpendicularly intersecting the second cutting edge so that the second cutting edge cuts a V-shape groove.

4. A hole cutter according to claim 3, in which said rake angle includes an inner rake angle between the first inner cutting surface and the horizontal plane, and an outer rake angle between the first outer cutting surface an the horizontal plane.

5. A hole cutter according to claim 4, in which said crest of the second cutting tooth is radially located between a radial outer point of the first cutting edge and the first crest of the first cutting tooth, the rake angle on the second outer cutting surface of the second cutting tooth being the same as the rake angle of the first outer cutting surface of the first cutting tooth.

6. A hole cutter according to claim 5, in which said first and second cutting teeth are alternately situated around the end portion of the cutter body.

7. A hole cutter according to claim 6, in which said cutter body includes a plurality of gullets between the two adjacent cutting teeth for ejecting chips therebetween.

8. A hole cutter according to claim 7, in which said cutter body further includes a plurality of ridges on an outer surface thereof, said ridges extending spirally rearwardly relative to the rotational direction of the cutter body and extending upwardly from the cutting teeth, two adjacent ridges forming therebetween a flute for ejecting chips.

* * * * *